United States Patent
Junkers

(10) Patent No.: US 7,207,760 B2
(45) Date of Patent: **\*Apr. 24, 2007**

(54) WASHER AND FASTENER PROVIDED WITH A WASHER

(76) Inventor: John K. Junkers, 8 Stonewall Rd., Saddle River, NJ (US) 07458

(\*) Notice: Subject to any disclaimer, the term of this patent is extended or adjusted under 35 U.S.C. 154(b) by 0 days.

This patent is subject to a terminal disclaimer.

(21) Appl. No.: 10/802,890

(22) Filed: Mar. 17, 2004

(65) Prior Publication Data

US 2004/0197160 A1    Oct. 7, 2004

Related U.S. Application Data

(60) Continuation-in-part of application No. 10/427,103, filed on Apr. 30, 2003, now Pat. No. 6,929,439, which is a continuation-in-part of application No. 10/120,343, filed on Apr. 11, 2002, now Pat. No. 6,883,401, and a continuation-in-part of application No. 10/112,101, filed on Mar. 29, 2002, now Pat. No. 7,066,053, which is a division of application No. 10/010,377, filed on Dec. 6, 2001, now Pat. No. 6,609,868.

(51) Int. Cl.
F16B 39/24    (2006.01)

(52) U.S. Cl. ............ 411/432; 411/5; 411/10; 411/219; 411/534; 411/533; 411/917

(58) Field of Classification Search ......... 411/1–5, 411/8, 9, 10, 432, 916, 917, 534, 162, 164, 411/533, 219
See application file for complete search history.

(56) References Cited

U.S. PATENT DOCUMENTS

| | | | |
|---|---|---|---|
| 1,678,409 A | 7/1928 | Ward | |
| 3,627,334 A | 12/1971 | Reddy | |
| 3,633,446 A | 1/1972 | Kawasaki | |
| 3,701,372 A | 10/1972 | Breed | |
| 3,728,933 A * | 4/1973 | Grube | 411/5 |
| 4,191,389 A | 3/1980 | Jelinek | |
| 4,362,449 A * | 12/1982 | Hlinsky | 411/156 |
| 4,572,718 A | 2/1986 | Stevens et al. | |
| 4,702,657 A | 10/1987 | Jelinek | |
| 4,836,727 A | 6/1989 | Volkmann | |

(Continued)

FOREIGN PATENT DOCUMENTS

| | | |
|---|---|---|
| DE | 24 18 598 | 10/1975 |
| EP | 0 708 259 | 4/1996 |
| EP | 1 058 014 | 12/2000 |
| EP | 1 080 847 A2 | 3/2001 |
| EP | 1 318 316 A2 | 6/2003 |

(Continued)

*Primary Examiner*—Katherine Mitchell
(74) *Attorney, Agent, or Firm*—Michael J. Striker

(57) ABSTRACT

A washer has a body having an axis and provided with a first face surface located at one axial side and adapted to cooperate with a nut, a second face surface located at an opposite axial side and adapted to cooperate with an object to be assembled or disassembled, and at least one additional turning resistant surface adapted to cooperate with a bolt, the additional turning resistant surface of the body being formed as a frictional surface providing a friction between the body and the bolt to frictionally impede the bolt from turning and at the same to allow the bolt to be displaced in an axial direction when the nut is turned, the second face surface of the body being formed to provide a friction between the body and the object and therefore to impede the body from turning, and the first face surface of the body being formed with a smaller frictional characteristic than the second face surface of the body to at least reduce dragging of the body into turning by the turning nut; and a fastener is provided with such washer.

19 Claims, 4 Drawing Sheets

U.S. PATENT DOCUMENTS

| | | | |
|---|---|---|---|
| 4,887,948 A | 12/1989 | Calmettes | |
| 4,892,000 A * | 1/1990 | Renk et al. | 74/467 |
| 4,971,493 A | 11/1990 | Herbst et al. | |
| 4,983,084 A | 1/1991 | Gray | |
| 5,090,854 A * | 2/1992 | Hafeli et al. | 411/186 |
| 5,137,408 A * | 8/1992 | Junkers | 411/432 |
| 5,190,423 A * | 3/1993 | Ewing | 411/134 |
| 5,341,560 A | 8/1994 | Junkers | |
| 5,533,852 A * | 7/1996 | Matthews | 411/534 |
| 5,538,379 A | 7/1996 | Junkers | |
| 5,539,970 A | 7/1996 | Junkers | |
| 5,640,749 A | 6/1997 | Junkers | |
| 5,779,413 A | 7/1998 | Cosenza | |
| 5,803,436 A * | 9/1998 | Hohmann et al. | 254/29 A |
| 5,865,581 A | 2/1999 | Sadri et al. | |
| 5,946,789 A | 9/1999 | Junkers | |
| 6,135,687 A * | 10/2000 | Leek et al. | 411/10 |
| 6,254,323 B1 * | 7/2001 | Junkers | 411/14.5 |
| 6,585,467 B2 | 7/2003 | Junkers | |
| 6,609,868 B2 * | 8/2003 | Junkers | 411/368 |
| 6,883,401 B2 | 4/2005 | Junkers | |
| 2001/0039858 A1 | 11/2001 | Junkers | |
| 2003/0031526 A1 * | 2/2003 | Grant | 411/158 |
| 2003/0108404 A1 | 6/2003 | Junkers | |
| 2003/0183045 A1 | 10/2003 | Junkers | |
| 2003/0198533 A1 | 10/2003 | Junkers | |

FOREIGN PATENT DOCUMENTS

| | | |
|---|---|---|
| EP | 1 348 878 A1 | 10/2003 |
| FR | 393 392 | 11/1930 |
| FR | 38 199 | 4/1931 |
| FR | 2 739 650 A | 4/1997 |
| GB | 1 317 319 | 5/1973 |
| SU | 1444 567 A1 | 12/1988 |
| TW | 350 900 | 1/1999 |
| WO | 93/09355 | 5/1993 |

* cited by examiner

WASHER AND FASTENER PROVIDED WITH A WASHER

CROSS-REFERENCE TO A RELATED APPLICATION

This application is a continuation-in-part of patent application Ser. No. 10/427,103, filed Apr. 30, 2003 now U.S. Pat. No. 6,929,439, which is a division of patent application Ser. No. 10/010,377; now U.S. Pat. No. 6,609,868; this application is also a continuation-in-part of patent application Ser. No.: 10/120,343 filed Apr. 11, 2002 now U.S. Pat. No. 6,883,401; and this application is also a continuation-in-part of patent application Ser. No. 10/112,101, filed Mar. 29, 2002 now U.S. Pat. No. 7,066,053.

BACKGROUND OF THE INVENTION

The present invention relates to a washer and a fastener provided with a washer.

It is known to fasten objects with one another with power tools which use fasteners having a multi-part replacement nut, for example including an inner sleeve, an outer sleeve, and a washer. Such a replacement nut is disclosed for example in our U.S. Pat. No. 5,341,560. Another replacement nut is disclosed in our U.S. Pat. No. 6,254,323 in which a bolt has a spline underneath its upper thread, to which a washer is non-rotatably connected, and the bolt also has engaging means for applying a reaction force, while an active force of the same tool turns the nut on the bolt thread and the washer face. In the fastener disclosed in both above mentioned patents, the common features are the use of the action and reaction force of one tool, the elimination of reaction arms on power tools, the conversion of torque to torsion-free bolt stretching and obtaining for the first time the desired residual bolt load rather than a torque, which is estimated based on calculated frictions rather than on actual frictions or a tension, which is based on estimated bolt relaxation when the force is transmitted from the elongated bolt to the hand-tight nut.

When in this application the "bolt" is used, it is used in a very broad term to cover any fastening element which is provided with a thread, such a bolt, a stud, a screw, a threaded rod, a stretch bolt, a through-bolt, a blind casing bolt, etc.

Some solutions are disclosed in U.S. patent application Ser. Nos. 10/112,101, 10/120,343, 10/427,103, and U.S. Pat. No. 6,609,868.

SUMMARY OF THE INVENTION

Accordingly, it is an object of the present invention to provide a washer and also a fastener with the washer, which provides further solutions to the above specified problems.

In keeping with these objects and with others which will become apparent hereinafter, one feature of the present invention resides, briefly stated, in a washer, comprising a body having an axis and provided with a first face surface located at one axial side and adapted to cooperate with a nut, a second face surface located at an opposite axial side and adapted to cooperate with an object to be assembled or disassembled, and at least one additional turning resistant surface adapted to cooperate with a bolt, said additional turning resistant surface of said body being formed as a frictional surface providing a friction between said body and the bolt to frictionally impede the bolt from turning and at the same to allow the bolt to be displaced in an axial direction when the nut is turned, said second face surface of said body being formed to provide a friction between said body and the object and therefore to impede said body from turning, and said first face surface of said body being formed with a smaller frictional characteristic that said second face surface of said body to at least reduce dragging of said body into turning by the turning nut.

In accordance with another feature of the present invention, a fastener is provided, comprising a bolt; a nut; and a washer placed on said bolt between said nut and an object to be assembled or disassembled, said bolt including a body having an axis and provided with a first face surface located at one axial side and adapted to cooperate with a nut, a second face surface located at an opposite axial side and adapted to cooperate with an object to be assembled or disassembled, and at least one additional turning resistant surface adapted to cooperate with a bolt, said additional turning resistant surface of said body being formed as a frictional surface providing a friction between said body and the bolt to frictionally impede the bolt from turning and at the same to allow the bolt to be displaced in an axial direction when the nut is turned, said second face surface of said body being formed to provide a friction between said body and the object and therefore to impede said body from turning, and said first face surface of said body being formed with a smaller frictional characteristic that said second face surface of said body to at least reduce dragging of said body into turning by the turning nut.

When the washer and the fastener are designed in accordance with the present invention, then the bolt which conventionally has a tendency to turn together with the nut is impeded from turning by the friction provided by at least one additional turning resistant surface of the body of the washer which cooperates with the bolt, and the body of the washer is impeded from turning by the friction provided by the second face surface of the washer which cooperates with the object, and simultaneously the nut during its turning experiences the lowest possible frictional resistance from the first face surface of the body of the washer and therefore does not engage the body of the washer into its turning process, so that the friction between the second face surface of the washer and the object even more reliably stops the washer from turning, and the friction between the turning resistant surface of the body of the washer and the object even more reliably holds the bolt from turning together with the nut.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
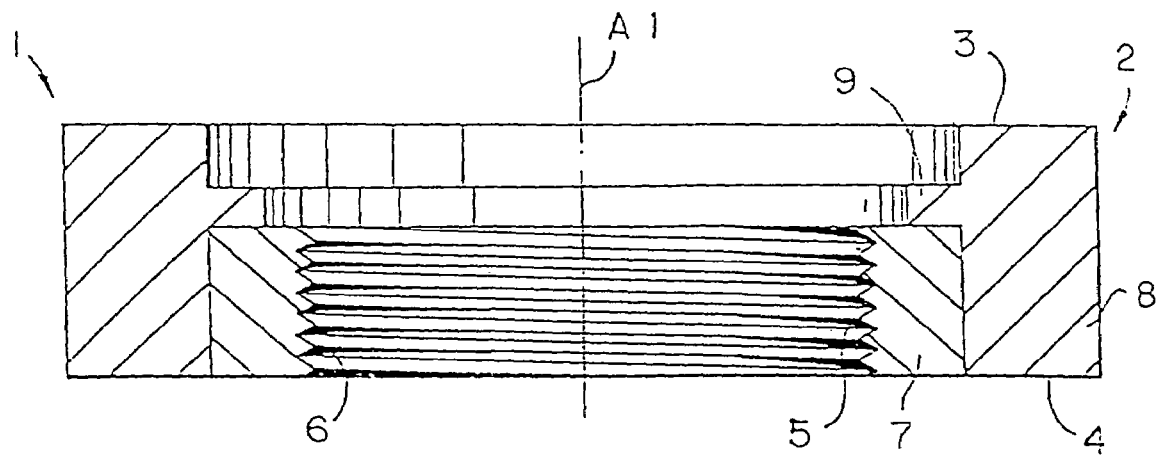
FIG. 1 is a view showing a washer in accordance with the present invention.

FIG. 1 shows a washer in accordance with the present invention, which is identified with reference numeral 1 as a whole. The washer 1 has a body which is identified with reference numeral 2. The body 2 of the washer 1 has an axis A1, a first upper face surface 3 adapted to cooperate with a nut, a second lower face surface 4 adapted to cooperate with an object which can be formed as two parts to be assembled with one another, and at least one additional, turning resistant surface identified with reference numeral 5.

The first and second face surfaces 3 and 4 are spaced from one another in an axial direction or in other words in a direction of the axis A1. The at least one additional, turning resistant surface 5 is located radially inwardly of the body 2 of the washer 1. The surface 5 is formed so that it frictionally interacts with a bolt to impede the bolt from turning when the nut is turned and the bolt is urged to turn together with the nut. The turning resistant surface 5 can be formed so as to engage with or wedge in a thread of the bolt, for example by providing a corresponding thread 6 on the surface 5.

As can be seen from FIG. 1, the body 2 of the washer 1 is composed of two parts 7 and 8 located substantially radially adjacent to one another, so that the part 7 is located radially inwardly of the part 8. The surface 5 with the thread 6 which impedes the turning of the bolt is provided radially inwardly of the part 7. The part 8 has a projection 9 which is located above the part 7 and prevents an axial upward displacement of the part 7. The projection 9 of the part 8 forms a resistive point, which in this embodiment is formed as a breaking point. In particular, the projection 9 is designed so that it can break under the action of a certain force acting in an axial upward direction.

While the surface 5 of the body 2 of the washer is formed to impede turning of the bolt during turning of the nut, the body 2 of the washer is also formed so that its turning in this process is impeded. In particular, the lower face surface 4 of the body 2 is formed as a frictional surface which has a significant friction to frictionally cooperate with the object, so that when the nut is turned and urges to turn the bolt which in turn urges to turn the washer, the body of the washer substantially does not turn or is impeded from turning because of the frictional cooperation between the second face surface 4 and the object. It is possible to take steps to increase the frictional characteristic of the lower face surface 4 of the body of the washer. In order to provide an increased friction of the surface 4 of the body 2 of the washer, the lower face surface 4 can be additionally roughened, provided with a friction increasing coating, etc.

On the other hand, the upper face surface 3 which cooperates with the nut is formed so that it has a smaller friction than the lower face surface 4 which cooperates with the object. In particular, it can be formed so as to provide the lowest possible friction between the body 2 of the washer and the nut, so that when the nut is turned it substantially does not involve (does not drag) the body 2 of the washer into the turning process, since the washer must be held non-turnable to impede the turning of the bolt. For this purpose, the upper face surface 3 of the washer can be machined so as to have a very low roughness and high sliding properties, it can be coated with a friction-reducing coating, etc. It is also possible to produce the body of the washer so that its upper face surface 3 is machined to reduce friction while its lower face surface is not machined and is rough.

Figure 2:
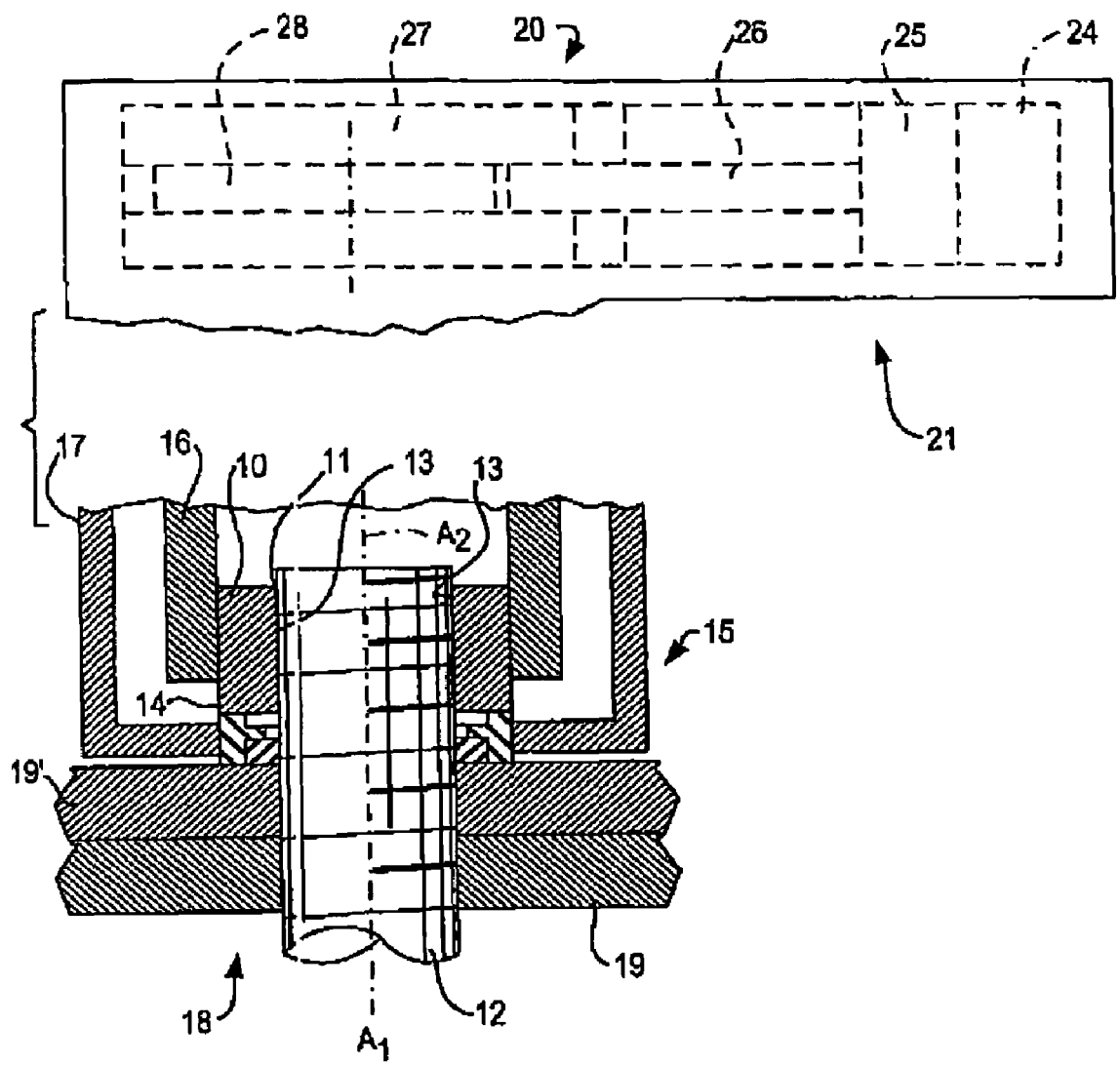
FIG. 2 is a view showing a fastener with a washer and a tool applied to the fastener, and a fastening method in accordance with the present invention.

FIG. 2 shows a fastener provided with the washer, and a tool applied to the fastener. The fastener has a nut 10 having an inner thread 11. The fastener further has a bolt 12 provided with an outer thread 13, and having an axis A2. The nut 10 has a lower face surface 14 which is adapted to be placed on the upper face surface 3 of the body 2 of the washer 1. The outer thread 13 of the bolt 12 engages with the inner thread 11 of the nut 10, and also engages with the inner thread 6 of the body 2 of the washer 1.

A power tool to be used with the washer of the present invention is identified with reference numeral 15. The power tool has a housing which is identified with reference numeral 20 and a power drive which is identified with reference numeral 21. The power drive is formed for example as a cylinder-piston unit which includes a cylinder 24, and a piston 25 which is movable in the cylinder and provided with a piston rod 26. The reciprocating movement of the piston rod 26 with the piston 25 is converted into a rotary movement of a ratchet 28 through at least one drive plate 27 provided with a not shown pawl engageable with teeth of the ratchet 28. A driving element 16 is connected with the turnable ratchet 28 on the one hand and engages the nut 10 on the other hand. In order to provide such an engagement the inner surface of the driving element 16 can be provided with connecting means, for example formed as a polygonal inner surface, etc.

The power tool additionally has a non-rotatable element 17 which is connected to the immovable housing 20 to absorb a reaction created during turning of the driving element. The non-rotatable element 17 engages the body 2 of the washer 1 to prevent its rotation about the axes A1 and A2, which coincide with one another when the fastener is assembled. In order to engage the washer, the non-rotatable element 17 can be provided with connecting means formed for example as a polygonal inner surface cooperating with a polygonal peripheral surface of the body 2 of the washer 1.

The fastener with the washer is provided for fastening an object which is identified with reference numeral 18, for example to assemble parts 19 and 19' of the object 18 with one another.

When as shown in FIG. 2, the power tool 15 is placed on the fastener so as to tighten or loosen the nut, the turning element 16 which is connected to the nut 10 turns the nut to overcome a thread friction with the bolt 12 and the facial friction with the washer 1 (which in accordance with the present invention can be very small) so as to turn the nut, and the non-rotatable element 17 holds the washer 1 to absorb the reaction force due to the facial friction of the washer 1 with the nut 10 (which in accordance with the present invention can be very small), its facial friction with one side of the part 19', and its turning friction with the bolt 12, so that the washer 1 does not turn but absorbs the reaction force of the power tool. Initially, when the nut 10 rotates, the bolt 12 rotates together with the nut; however, the stationary washer 1 wedges the stationary part 7 into the bolt thread 13, so that the bolt stops turning because of the interengagement of its outer thread 13 with the thread 6 of the washer 1. Therefore, the bolt 12 is stopped, and an axial force is applied to the washer 1, in particular to its part 7 in an axial upward direction when the bolt 12 is elongated by the turning nut 10. Under the action of this axial upward force, the resistive point of the washer is overcome and in particular the projection 9 of the part 8 of the washer 1 breaks off and the part 8 of the washer 1 is pulled upwardly.

Figure 3:
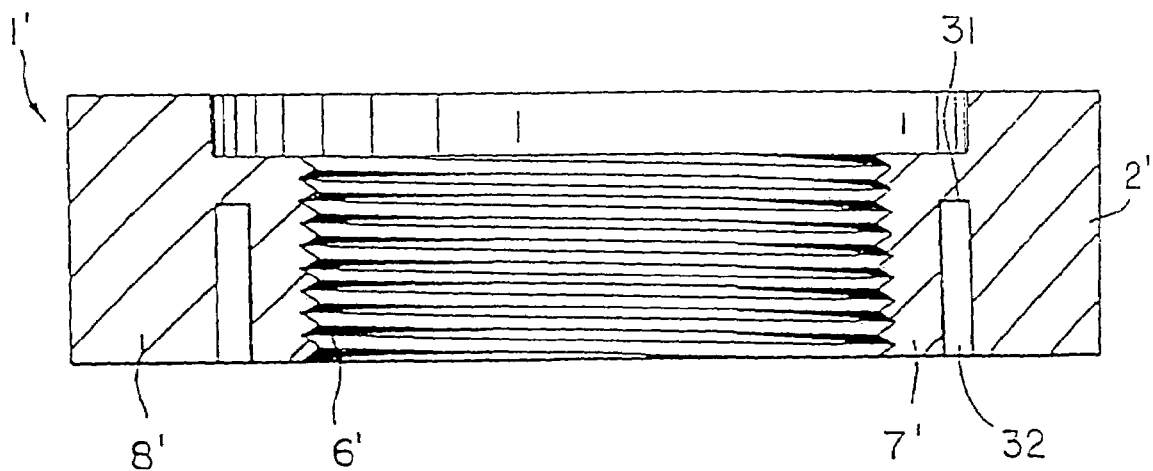
FIG. 3 is a view showing a further embodiment of the washer in accordance with the present invention.

FIG. 3 shows another embodiment of the washer in accordance with the present invention. Here the washer which is identified with reference numeral 1' has a body 2' which is formed as a one-piece integral element with a partition 31 and a groove 32 provided to reduce a thickness of the partition and to make it breakable.

The operation of the washer 1' in accordance with the second embodiment of the present invention is substantially similar to the operation of the washer 1 of the embodiment shown in FIG. 1. When the nut 10 is turned by the driving element 16 of the power tool, the bolt 12 has a tendency to turn together with the nut. As the washer 1' is held stationary and consequently the inner part 7', the bolt becomes stationary due to the interengagement of its outer thread 13 with the inner thread 6' of the body 2' of the washer 1, but is elongated in the axial direction. An axial force which is generated during the elongation of the bolt 12 is applied axially upwardly to the radially inner part 7' of the washer 1', trying to displace the inner part 7', so that eventually it breaks the partition 31, which constitutes the resistive point, and displaces the inner part 7' of the washer 1' axially upwardly relative to the outer part 8'.

Figure 4:
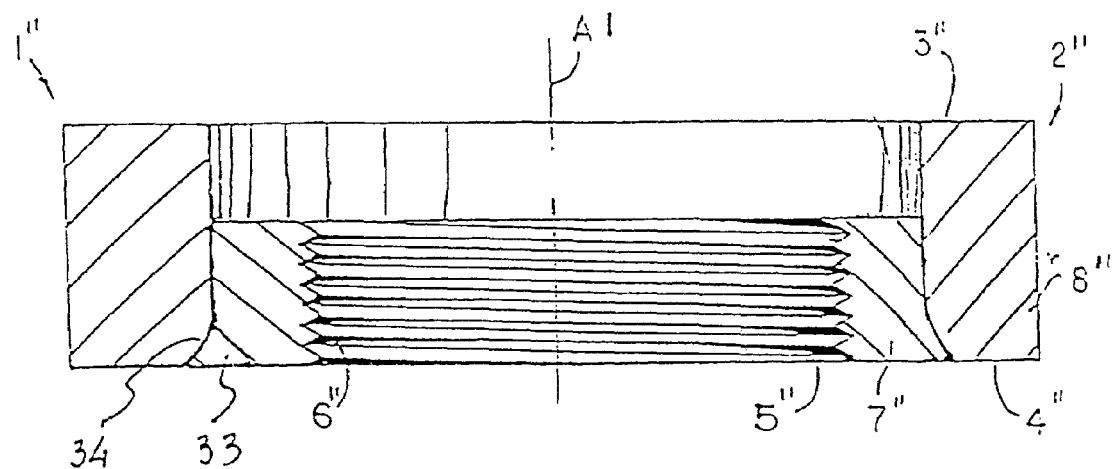
FIG. 4 shows still a further embodiment of the washer in accordance with the present invention.

FIG. 4 shows a further embodiment of the washer in accordance with the present invention. Here the washer which is identified with reference numeral 1" has a body 2". The body 2" of the washer 1" has a first upper face surface 3" adapted to cooperate with the nut, a second lower face surface 4" adapted to cooperate with an object, and the turning resistant surface identifies with reference numeral 5". The turning resistant surface 5" is located radially inwardly and is formed to engage as a wedge in a thread of the bolt, for example by providing a corresponding thread 6" on the turning resistant surface 5". The body 2" of the washer 1" is composed of two parts 7" and 8" located substantially radially adjacent to one another, so that the part 7" is located radially inwardly of the part 8". The turning resistant surface 5" with the thread 6" is provided radially inwardly on the part 7".

The part 7" has a skirt-shaped portion 33 which is received in a correspondingly shaped lower portion 34 of an opening of the part 8". The formations 33, 34 form a resistive point of the washer. When the part 7" is pulled up after stopping the bolt from turning, the skirt-shaped portion 33 of the part 7" is slightly and permanently deformed to the size of to the straight portion of the inner opening of the part 8", to permit further upward sliding of the part 7" as the bolt elongates.

Figure 5:
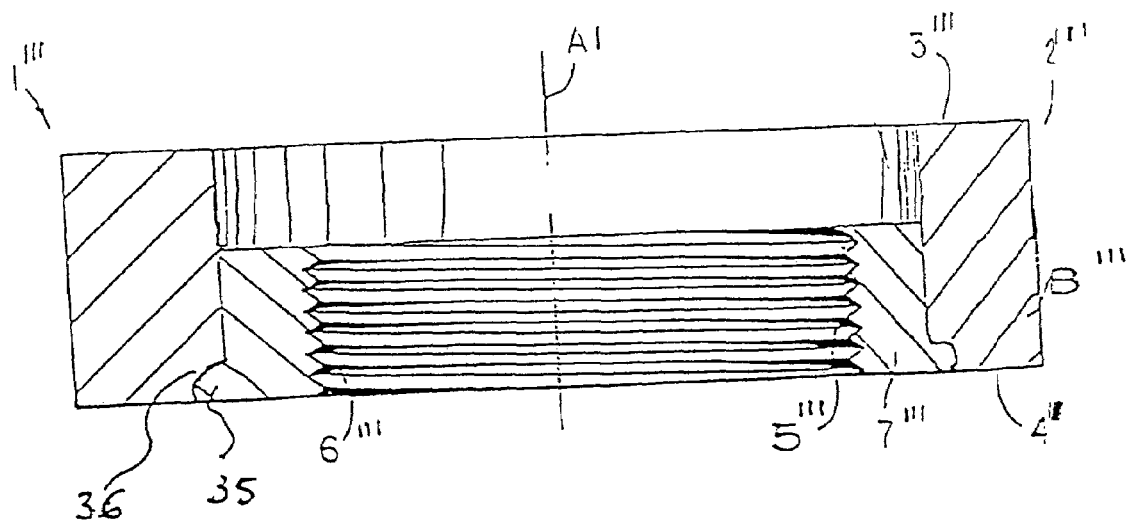
FIG. 5 shows an additional embodiment of the washer in accordance with the present invention.

FIG. 5 is a view showing a further embodiment of the present invention. The washer is identified with reference numeral 1''' and has a body 2'''. The body 2''' of the washer 1''' has a first upper surface 3''' adapted to cooperate with the nut, a second lower face surface 4''' adapted to cooperate with an object, and the turning resistant surface identifies with reference numeral 5'''. The turning resistant surface 5''' is located radially inwardly and is formed to engage as a wedge in a thread of the bolt, for example by providing a corresponding thread 6''' on the turning resistant surface 5'''. The body 2''' of the washer 1''' is composed of two parts 7''' and 8''' located substantially radially adjacent to one another, so that the part 7''' is located radially inwardly of the part 8'''. The turning resistant surface 5''' with the thread 6''' is provided radially inwardly on the part 7'''.

In the embodiment shown in FIG. 5 the part 7''' is provided in its lower portion with an outer knurl-portion 35 which is received in a correspondingly shaped lower portion 36 of an opening of the part 8". The knurl-shaped portion 35 of the part 7''' is press-fit in the lower portion 36 of the opening in the part 8'''. During the operation when the bolt is stopped and elongates, the knurl-shaped portion 35 is squashed, but still leaves enough friction to permit an upward movement of the part 7''' relative to the part 8''' without turning.

Figure 6:
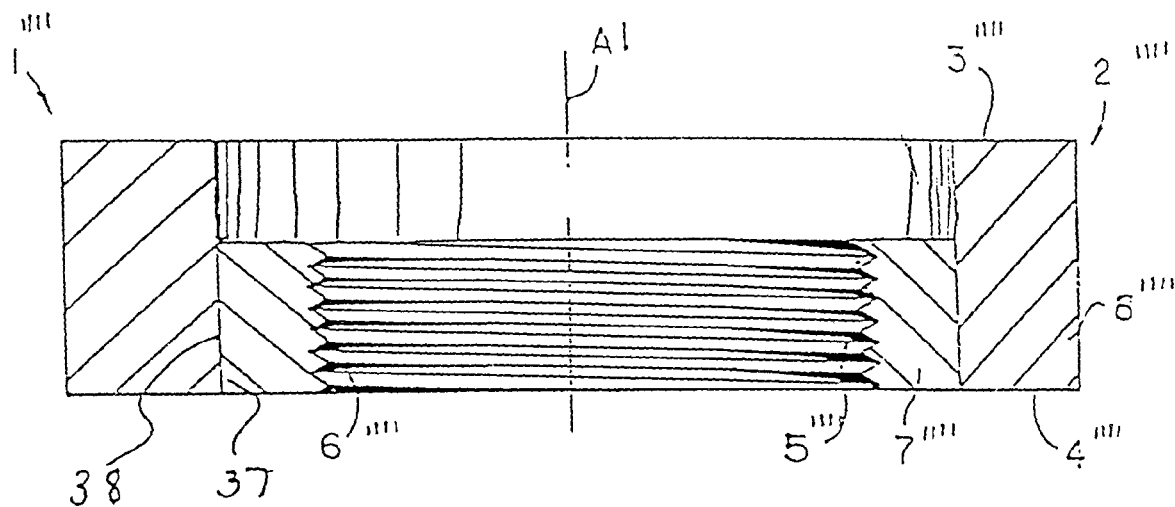
FIG. 6 shows still a further embodiment of the washer in accordance with the present invention.

In the embodiment shown in FIG. 6 the washer is identified with reference numeral 1"" and has a body identified as 2"". The body 2"" of the washer 1"" has a first upper face surface 3"" adapted to cooperate with the nut, a second lower face surface 4"" adapted to cooperate with an object, and the turning resistant surface identifies with reference numeral 5"". The turning resistant surface 5"" is located radially inwardly and is formed to engage as a wedge in a thread of the bolt, for example by providing a corresponding thread 6"" on the turning resistant surface 5"". The body 2"" of the washer 1"" is composed of two parts 7"" and 8"" located substantially radially adjacent to one another, so that the part 7"" is located radially inwardly of the part 8"". The turning resistant surface 5"" with the thread 6"" is provided radially inwardly on the part 7"".

In the embodiment of FIG. 6 the diameter of an outer surface 37 of the part 7"" and the diameter of an inner surface 38 of an opening in the part 8"" are selected so that the inner surface 38 of the opening of the part 8"" is press-fit on the outer surface 37 of the part 7"". The surfaces 37 and 38 form a resistive point of the washer. The press-fit is selected so that after the bolt is stopped and an axial force is applied to the washer 1"" in an axial direction when the bolt 12 is elongated, the press fit of the surfaces 37 and 38 is overcome and the part 7"" can axially slide relative to the part 8"".

In the embodiments shown in FIGS. 3–7, similarly to the embodiment shown in FIG. 1, the upper face surface of the body 2 of the washer 1 has a low frictional characteristic, while the lower face surface of the body 2 of the washer 1 has a high frictional characteristic, which can be achieved by the same means as described in connection with the embodiment shown in FIG. 1.

It will be understood that each of the elements described above, or two or more together, may also find a useful application in other types of constructions differing from the types described above.

While the invention has been illustrated and described as embodied in washer, fastener provided with a washer, method of power tool for fastening with the use of the washer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A washer to be located between a nut and an object, comprising a body having an axis and provided with a first axial outer face surface located at one axial side and adapted to cooperate with the nut, a second axial outer face surface located at an opposite axial side and adapted to cooperate with the object to be assembled or disassembled, and at least one radially inner surface adapted to cooperate with a bolt; first means provided on said radially inner surface for providing a friction between said body and the bolt to frictionally impede the bolt from turning and at the same to allow the bolt to be displaced in an axial direction when the nut is turned; second means provided on said second axially outer face surface of said body for increasing friction of said second axially outer face surface of said body to increase a friction between said body and the object so as to impede said body from turning; and third means provided on said first axially outer face surface of said body for reducing a friction of said first axially outer face surface of said body to reduce a friction between said body and the nut so as to at least reduce dragging of said body into turning by the turning nut, so that when the nut is turned the body substantially is not dragged into turning because of said third means and said body is impeded additionally from turning by said second means so that said body of the washer does not turn and impedes the bolt from turning by said first means and thereby the body of the washer does not turn but is only displaced in an axial direction, said body including a radially inner portion provided with said radially inner surface having said first means for providing a friction between said body and the bolt, and a radially outer portion which does not have first means for providing a friction between said body and said bolt, so that said radially inner portion engages the bolt while said radially outer portion does not, and said radially inner portion displaces, in said axial direction relative to said radially outer portion, inside said radially outer portion.

2. A washer as defined in claim 1, wherein said body is formed as a single element provided with said surfaces and said first, second and third means.

3. A washer as defined in claim 1, wherein said body is composed of at least two portions, one of which is provided with said radially inner surface and with said first means.

4. A washer as defined in claim 1, wherein said additional radially inner surface of said body with said first means is formed so as to be connectable with a thread of the bolt.

5. A washer as defined in claim 1, wherein said body has a portion provided with said radially inner surface and said first means and movable in the axial direction.

6. A washer as defined in claim 1, wherein said body has one portion provided with said radially inner surface and said first means, and another portion which is frictionally connected with said one portion and provided with said second axially outer face surface and said second means adapted to frictionally cooperate with the object.

7. A washer as defined in claim 1, wherein said body has one portion provided with said radially inner surface and said first means, and another portion which is connected with said one portion via a breaking point which breaks when said one portion of said body is displaced together with the bolt in the axial direction.

8. A washer as defined in claim 1, wherein said body has at least one resistive point which is formed so that when the nut is turned and said first means of said radially inner surface stops the bolt from turning, a pull on the bolt created by the nut and elongating the bolt applies to said body an axial force which overcomes said at least one resistive point so that a portion of said body is allowed to be pulled axially when the bolt elongates.

9. A washer as defined in claim 1, wherein said body has a radially inner part provided with said radially inner surface adapted to cooperate with a bolt and having said first means, and a radially outer part arranged so that when the nut is turned and turns the bolt said body of the washer stops the bolt from turning and thereby the nut creates a pull on the bolt which elongates the bolt in an axial direction and applies to said radially inner part an axial force so that said radially outer part of said body does not move axially while said radially inner part of said body is allowed to pull axially when the bolt elongates and said radially inner part moves into an axial space which remains in said radially outer part.

10. A washer as defined in claim 1, wherein said second means is configured so that said second axially outer face surface of said body has a friction which is greater than a friction of a remaining portion of said body, while said third means is configured so that said first axially outer face surface of said body has a friction which is smaller than a remaining portion of said body.

11. A fastener, comprising a bolt; a nut; and a washer placed on said bolt between said nut and an object to be assembled or disassembled, said washer including a body having an axis and provided with a first axially outer face surface located at one axial side and adapted to cooperate with a nut, a second axially outer face surface located at an opposite axial side and adapted to cooperate with an object to be assembled or disassembled, and at least one radially inner surface adapted to cooperate with a bolt; first means provided on said radially inner surface for providing a friction between said body and the bolt to frictionally impede the bolt from turning and at the same to allow the bolt to be displaced in an axial direction when the nut is turned; second means provided on said second axially outerface surface of said body for increasing friction of said second axially outer face surface of said body to increase a friction between said body and the object to impede said body from turning; and third means provided on said first axially outer face surface of said body for reducing a friction of said first axially outer face surface of said body to reduce a friction between said body and the nut so as to at least reduce dragging of said body into turning by the turning nut, so that when the nut is turned the body substantially is not dragged into turning because of said third means and said body is impeded additionally from turning by said second means so that said body of the washer does not turn and impedes the bolt from turning by said first means and thereby the body of the washer does not turn but is only displaced in an axial direction, said body including a radially inner portion provided with said radially inner surface having said first means for providing a friction between said body and the bolt, and a radially outer portion which does not have first means for providing a friction between said body and said bolt, so that said radially inner portion engages the bolt while said radially outer portion does not, and said radially inner portion displaces, in said axial direction relative to said radially outer portion, inside said radially outer portion.

12. A fastener as defined in claim 11, wherein said body including said portion is formed as a single element provided with said additional turning resistant surface.

13. A fastener as defined in claim 11, wherein said body is composed of at least two portions, one of which is provided with said additional turning resistant surface.

14. A fastener as defined in claim 11, wherein said additional turning resistant surface of said body is formed so as to be connectable with a thread of the bolt.

15. A fastener as defined in claim 11, wherein said body has a portion provided with said additional turning resistant surface and movable in the axial direction.

16. A fastener as defined in claim 11, wherein said body has one portion provided with said additional turning resistant surface, and another portion which is frictionally connected with said one portion and provided with said second face surface which is adapted to frictionally cooperate with the object.

17. A fastener as defined in claim 11, wherein said body has one portion provided with said additional turning resistant surface, and another portion which is connected with said one portion via a breaking point which breaks when said one portion of said body is displaced together with the bolt in the axial direction.

18. A fastener as defined in claim 11, wherein said body has at least one resistive point which is formed so that when the nut is turned and said additional turning resistant surface stops the bolt from turning, a pull on the bolt created by the nut and elongating the bolt applies to said body an axial force which overcomes said at least one resistive point so that a portion of said body is allowed to be pulled axially when the bolt elongates.

19. A fastener as defined in claim 11, wherein said second means is configured so that said second axially outer face surface of said body has a friction which is greater than a friction of a remaining portion of said body, while said third means is configured so that said first axially outer face surface of said body has a friction which is smaller than a remaining portion of said body.

* * * * *